US009483789B1

(12) United States Patent
Hanlon et al.

(10) Patent No.: US 9,483,789 B1
(45) Date of Patent: Nov. 1, 2016

(54) AUTOMATED BUNDLE DISCOVERY PLATFORM

(75) Inventors: Jon T. Hanlon, Mercer Island, WA (US); Samuel Theodore Sandler, Seattle, WA (US); Daniel Tarekegn, Seattle, WA (US); Monica T. McCann, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 860 days.

(21) Appl. No.: 13/592,195

(22) Filed: Aug. 22, 2012

(51) Int. Cl.
G06Q 30/00 (2012.01)
G06Q 30/06 (2012.01)

(52) U.S. Cl.
CPC .................. *G06Q 30/0631* (2013.01)

(58) Field of Classification Search
CPC ...................... G06Q 30/0631; G06Q 30/0244
USPC ........................................ 705/26.1, 27.1, 28
See application file for complete search history.

(56) References Cited

U.S. PATENT DOCUMENTS

| 6,990,488 | B1 | 1/2006 | Chenault | |
|---|---|---|---|---|
| 8,060,414 | B1 | 11/2011 | Lin et al. | |
| 8,185,446 | B1 | 5/2012 | Kuznetsova et al. | |
| 8,285,602 | B1 * | 10/2012 | Yi et al. | 705/26.7 |
| 2005/0114235 | A1 * | 5/2005 | Snyder | G06Q 10/087 705/28 |
| 2012/0245976 | A1 * | 9/2012 | Kumar et al. | 705/7.29 |

OTHER PUBLICATIONS

U.S. Appl. No. 12/366,941, filed Feb. 6, 2009, Dixon, et al., "Bundled Digital Content".
U.S. Appl. No. 12/426,441, filed Apr. 20, 2009, Chandra, et al., "Automated Selection of Three of More Items to Recommend as a Bundle".
U.S. Appl. No. 12/622,242, filed Nov. 19, 2009, Levitan, et al., "System for Recommending Item Bundles".
U.S. Appl. No. 13/230,451, filed Sep. 12, 2011, Khobragade, et al., "Using Avatars in Commerce".
Agrawal et al, "Fast Algorithms for Mining Association Rules," Proceedings of the 20th VLDB Conference, Santiago, Chile, Sep. 1994, 13 pgs.
Agrawal et al, "Mining Association Rules Between Sets of Items in Large Databases," Proceedings of the 1993 ACM SIGMOD International Conference on Management of Data, SIGMOD '93, May 1993, 10 pgs.

* cited by examiner

Primary Examiner — Brandy A Zukanovich
(74) Attorney, Agent, or Firm — Lee & Hayes, PLLC

(57) ABSTRACT

Disclosed herein is a platform for automating the discovery of product bundles that are promising for sale to customers (i.e., they are relevant, valuable and/or timely). Techniques are disclosed for generating a set of potential product bundles according to criteria, thresholds and/or scores which indicate a propensity for items to be purchased together by customers. The generated set of potential product bundles may be ranked according to opportunity metrics and/or scores which indicate value to a merchant and/or customers. A subset of product bundles is selected from the set of potential product bundles based at least in part on the ranking, and each product bundle in the selected subset is matched to one or more entities, such as merchants. These product bundles may then be presented to the associated (i.e., matched) entity based on some criteria, such as offerings of the merchants.

28 Claims, 6 Drawing Sheets

AUTOMATED BUNDLE DISCOVERY PLATFORM

BACKGROUND

In today's competitive retail environment, merchants seek opportunities to stay competitive among growing competition. To this end, merchants have explored innovative ways of advertising and providing enhanced purchasing environments in order to attract, and retain, customers, thereby increasing sales. In addition, techniques such as cross-selling (i.e., selling an additional product or service to an existing customer) or upselling (i.e., inducing the customer to purchase more expensive items, upgrades, or add-ons) have proven effective for merchants.

Similarly, product bundling (also referred to herein as "bundling") is a technique that has proven successful particularly in the context of electronic commerce, or e-commerce. Product bundling, as defined herein, is the creation of groups of two or more items that, as a group, may be offered for sale and thereby purchased with a single transaction. Through product bundling, merchants are not only able to reduce slow-selling inventory, but they are also able to increase product awareness, thereby increasing sales and imparting value to their customers. Currently, product bundles are offered in an ad hoc manner, leaving the merchant to question whether they are choosing the right items to bundle. In addition, current techniques for product bundling are overly cumbersome, manual processes notwithstanding the wealth of information available relating to customers' behavior on e-commerce websites and the like. In other words, merchants may not be fully utilizing the information and tools at their disposal for efficiently identifying product bundles that are the most relevant and timely bundles they can offer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
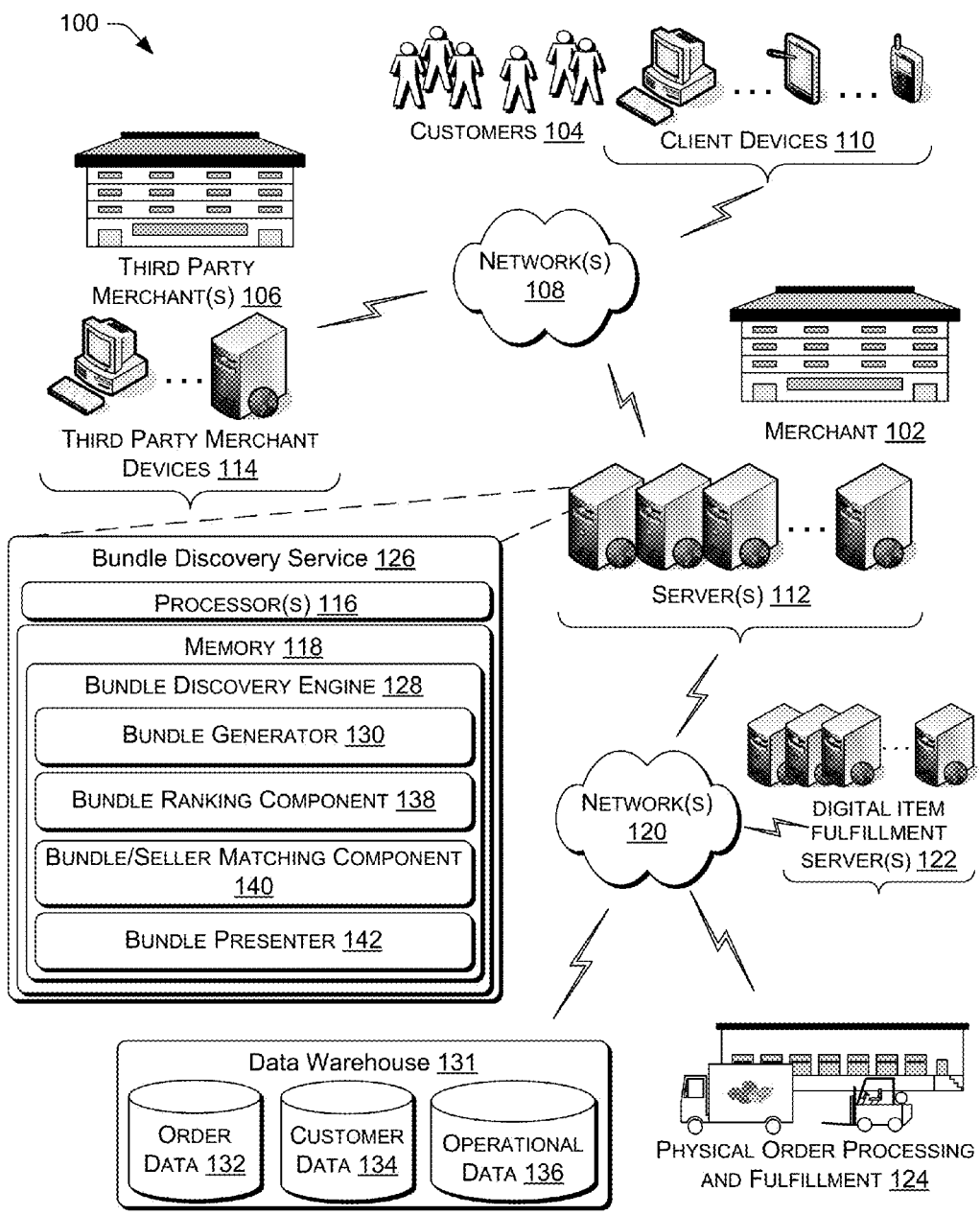
FIG. 1 illustrates an example architecture for generating and identifying product bundles.

Embodiments of the present disclosure are directed to, among other things, a platform for automating the discovery of promising (i.e., relevant, valuable and timely) product bundles. These product bundles may be presented to merchants, enabling them to offer product bundles that can maximize their profits and provide added value to their customers through the offer of preferred product bundles at discounted prices.

In embodiments of the disclosure, a platform for automating the discovery of promising (i.e., relevant, valuable and timely) product bundles comprises a bundle generator to generate a set of potential product bundles by accessing data such as order, or sales, data, customer data, and/or operational data, described in more detail below. The bundle generator may generate, or select, potential bundles to include in the set of potential product bundles according to some criteria, such as the category of the item (e.g., cameras, books, digital music or movies, etc.), and/or according to thresholds for the number of times an item, or group of items, has been purchased. The bundle generator may additionally, or alternatively, generate bundles based at least in part on a score computed for a set of two or more items. The platform further comprises a bundle ranking component to rank, or score, the set of potential product bundles relative to one another according to opportunity metrics and/or scores, which indicate value to the customer and/or value to the merchant. The platform also comprises a bundle/seller matching component to select the highest ranking bundles based on a criteria and/or a threshold, and is further configured to match, or pair, a merchant(s) with the selected bundles based on available offerings of the merchant(s), which may include available inventory for products, available scheduling for services, and the like. Lastly, the platform may comprise a bundle presenter to present, display, or otherwise communicate a matched bundle(s) to its associated merchant(s) as a suggested, or possible, product bundles(s). The bundle presenter may display the selected bundle(s) on a user interface that is associated with the merchant(s). The user interface for each merchant may further include a back-end filter(s) and/or management tools to enable the merchant to manage, or customize, their own queue of suggested, and/or possible, product bundles.

In further embodiments, a merchant may implement a manual review process before the presentation of bundles in order to manually select a bundle(s) from the selected bundle(s) for presentation. This optional intermediary process may be implemented to ensure that clutter is minimized at presentation and that the bundle(s) presented meet strategic objectives according to the merchant. Furthermore, the bundle discovery and generation process may be iteratively executed with continuous monitoring and feedback of the performance of selected product bundles (i.e., do the selected product bundles increase, or maximize, sales or profits for the merchant(s)?) such that the platform may utilize the actual performance of selected product bundles as an input to the system.

In further embodiments, the bundle ranking information, or the selected set of product bundles, may be utilized by a physical product fulfillment center to enable efficient organization of the physical inventory in warehouses utilized for fulfilling orders. For example, products within high ranking product bundles may be placed in close proximity to one another within the warehouse in order to reduce transport distance when fulfilling bundle orders.

For purposes of discussion, the bundle discovery platform is described in the context of an e-commerce system. One illustrative implementation of this context is provided below. However, it should be appreciated that the described bundle discovery platform may be implemented in other contexts. Moreover, other bundle discovery techniques may be performed by the illustrated architecture.

Example Architecture

FIG. 1 illustrates an example architecture 100 for implementing a bundle discovery platform. In the architecture 100, a merchant 102 may offer, via a website, items, or product bundles, to customers 104 who may browse and/or search the items, or product bundles, available from the merchant 102, or from a third party merchant(s) 106 whose items may be hosted on the merchant's 102 website. Customers 104 may enter into a transaction for the item(s), or product bundles, offered on the website by accessing the website via a network 108. The network 108 represents any one or combination of multiple different types of networks, such as wide area networks (WANs) or local area networks (LANs) and including cable networks, the Internet, and wireless networks. Customers 104 may utilize client computing devices 110 to access the website, or any other website, via the network 108. The client computing devices 110 may be implemented as any number of computing devices, including a personal computer, a laptop computer, a portable digital assistant (PDA), a mobile phone, a tablet computer, a set-top box, a game console, and so forth. Each client computing device is equipped with one or more processors and memory to store applications and data. According to some embodiments, a browser application is stored in the memory and executes on the processor to provide access to the website. The browser renders web pages served by the website on an associated display. Although embodiments are described in the context of a web based system, other types of client/server-based communications and associated application logic could be used.

The website may be provided by one or more server(s) 112 which may be owned, or controlled, by the merchant 102. The server(s) 112 may be arranged in a cluster or as a server farm, and may host the website or another type of information server. Other server architectures may also be used to host the website. When a user (e.g., one of the customers 104) accesses the website, the client computing device 110 submits a request, such as in the form of a uniform resource locator (URL), to the server(s) 112. Upon receiving the request, the server(s) 112 return a web page back to the requesting client device 110. In the context of a merchant website, the returned web page may allow the customer to browse and/or search an electronic catalog and complete a transaction.

The web site is capable of handling requests from many users and serving, in response, various web pages that can be rendered at the client computing devices 110. The website can be any type of website that supports user interaction, including online retailers, e-commerce sites, informational sites, social networking sites, social commerce sites, blog sites, search engine sites, news and entertainment sites, and so forth.

As an overview, items that may be bundled into product bundles, may include products and/or services, generally, which may include, but are not limited to, physical products, downloaded or streamed digital products (e.g., audio or video files, electronic books (e-books), etc.), services, sellable units, customer profiles, customer-created content, or anything else which might be consumed, purchased, rented, subscribed to, leased, loaned or viewed (hereinafter "purchased") physically, digitally or otherwise via a payment transaction. Product bundling (also referred to herein as "bundling"), as defined herein, is the creation of groups of two or more items that, as a group, may be offered for sale and thereby purchased with a single transaction, typically via a single detail page and/or as a single catalog item. For example, a camera, which may be an item that is available for individual purchase, may also, or alternatively, be included in a product bundle along with a lens, a camera bag, a memory card, a battery, or any other item, whether it is related or unrelated to the camera. As another example, snow skis may be available for individual purchase, but may also, or alternatively, be included in a product bundle along with a service such as a week's worth of ski lessons from an instructor. Merchants who sell, divest, rent, lease or loan (hereinafter "sell") items to consumers may include, but are not limited to, merchandisers, sellers, third party sellers, vendors, agents, wholesalers, or middlemen (hereinafter "merchants").

In the illustrative environment, the website represents a merchant website that hosts an electronic catalog with one or more items, or product bundles. In some embodiments the item(s), or product bundles, may be offered by the merchant 102 for consumption by customers 104. However, in some embodiments the merchant 102 may host items, or product bundles, that third party merchants 106 are selling using the merchant's website. The third party merchant(s) 106 may use a third party merchant computing device(s) 114 in order to access the server(s) 112 for selling items, or product bundles, that the third party merchant(s) 106 has available for offering.

In FIG. 1, the servers 112 comprise one or more processors 116 and one or more forms of computer-readable memory 118. The memory 118 may comprise volatile and nonvolatile memory. Thus, the memory 118 may include, but is not limited to, random access memory (RAM), read-only memory (ROM), erasable programmable read-only memory (EEPROM), flash memory, or other memory technology, or any other medium which can be used to store applications and data. The memory 118 may also include removable media such as optical storage media, including optical disks, or magnetic cassettes, magnetic tape, magnetic disk storage or other magnetic storage devices, redundant array of independent disks (RAID) storage systems, portable devices/drives, and so forth. The memory 118 may be used to store any number of functional, or executable, components, such as programs and program modules that are executable on the processor(s) 116 to be run as software. Each component stored in the memory 118 may comprise computer-executable instructions that, when executed, cause the one or more processors 116 to perform acts and to implement techniques described herein. Each component may be in the form of data structures, program modules, or other data.

The architecture 100 may also comprise order servers with appropriate modules, such as a checkout manager, to facilitate collecting and processing customer payment information, which enables a customer, such as one of the customers 104, to complete a transaction. When the customer elects to purchase an item, or product bundle, the customer is directed to a checkout page, otherwise known as a "payment processing page" or "shopping cart page" where the customer can begin completing the transaction. Often, the customer is initially provided with a list of the items, or product bundles, that he or she has elected to purchase. Once the customer is satisfied with the item list, the website may direct the customer to a checkout page where the order servers, via the checkout manager, may access payment data provided by the customer to complete the transaction.

In some embodiments, the server(s) 112 are capable of processing orders of items, or product bundles, for customers 104, and initiating fulfillment of the items. When the merchant 102 is a retailer selling digital content, such as digital music files, the server(s) 112 may transmit the digital content directly to the customer and thereby directly fulfill the order. Additionally, or alternatively, the server(s) 112 may initiate fulfillment of digital items, or product bundles, by sending a fulfillment request via a network 120 to be fulfilled by another entity, such as digital item fulfillment server(s) 122. However, for merchants 102 selling physical products, the servers may initiate a fulfillment request via the network 120 to a physical order and processing fulfillment center 124 where physical products in a warehouse may be shipped by mail or otherwise delivered to the customers 104 as individually packaged products, or as a group package. The network 120 represents any one or combination of multiple different types of networks, such as wide area networks (WANs) or local area networks (LANs) including cable networks, the Internet, Intranets, and wireless networks.

The servers(s) 112 may further include a bundle discovery service 126 which utilizes a platform, (sometimes referred to herein as a "bundle discovery engine" 128), for the discovery of product bundles. The bundle discovery engine 128 provides the foundation, or the platform, on which merchants 102 may generate and/or identify product bundles which they may choose to offer for sale on their website, or which they may recommend to third party merchant(s) 106. Furthermore, the bundle discovery service 126 may be implemented and utilized by merchant 102, or it may optionally be sold to third parties, such as vendors or manufacturers who may purchase, or otherwise pay for access to, the bundle discovery service 126. Accordingly, the bundle discovery service 126 may be internal, or external, to the architecture 100. The bundle discovery engine 128 includes a bundle generator 130 configured to generate a set of potential product bundles based in part on criteria and/or thresholds as compared to any of order, or sales, data, customer data, and/or operational data, explained in more detail below. The bundle generator 130 may be designed to over-generate product bundles so as to not miss any potential bundling opportunities. With this in mind, the bundle discovery engine 128 relies on downstream ranking and filtering to select appropriate product bundles from the set of potential product bundles generated by the bundle generator 130.

As mentioned above, the bundle generator 130 may access various types of data that may be located in data stores within a data warehouse 131, and then may apply criteria and/or thresholds in order to produce the set of potential product bundles. The data warehouse 131 may be accessible via network(s) 120 such that the bundle generator 130 may access the various data stores within the data warehouse 131. Additionally, or alternatively, data may be accessed by scanning traffic streams containing the data of interest. One type of data that may be accessed includes order, or sales, data (hereinafter "order data 132"). The order data 132 includes information relating to orders of items, such as what items were purchased, by whom, and when they were purchased. This information may be further processed in order to obtain information including, but not limited to, a number of times an item was purchased within a time period, a number of times an item was purchased by a particular customer, or by a friend of the customer as defined by a social network, whether an item was purchased within a window of time from the purchase of another item by the same customer, a number of times that a set of two or more items were purchased together at the same time by a single customer, a number of times that a set of two or more items were promoted together (via analysis of promotion sales discount configuration data, and analysis of advertising click-through metrics), and a number of times that a set of two or more items were viewed together by a single customer. For example, the order data 132 may include information associated with the number of times a particular camera model was purchased with a particular camera bag. If the camera and the camera bag were purchased a number of times in excess of a threshold number, this particular combination of items may be included in the set of product bundles ultimately generated by the bundle generator. It should be appreciated that unrelated items in different item categories may be analyzed in the same way, and that the method of generating product bundles is in no way limited to items of the same or similar item categories. For instance, two items that are largely unrelated, such as diapers and video monitors, may not be readily identified by a merchant 102 for consideration of items that could potentially be bundled together. Yet, the order data 132 may include information indicating that these two items are frequently purchased together. At its core, the order data 132 includes information on what items were purchased, the price they were purchased for, whether they were purchased individually or in combination with other items, as well as by whom and when they were purchased. This data may be used by the bundle discovery engine 128 in order to discover promising product bundles. The order data 132 is accessible, directly or indirectly, by one or more of the servers 112 via the bundle generator 130.

In addition to the order data 132, the architecture 100 includes customer data 134 that includes information about the customers 104, such as customer account information, customer-specific purchase information, customer preferences or item reviews from customers, social network information, and other information associated with the customer. For instance, the bundle generator 130 may access customer data 134 comprising a customer review from a customer that specified how much that customer enjoyed using the above-mentioned camera bag with the camera that they purchased. The bundle generator may utilize criteria relating to item categories, or a number of items that must be specified within a certain number of words from one another within the customer review in order to decide whether a product bundle including the camera and the camera bag should be included in the set of potential product bundles. Like the order data 132, the customer data 134 is also accessible, directly or indirectly, by one or more of the servers 112 via the bundle generator 130.

Furthermore, the architecture 100 includes operational data 136 that provides information relating to, among other things, offerings of merchants (e.g., inventory of products, availability of scheduling for services, etc.), information associated with item returns, item category information, information regarding when new items are released as well as historical or related item data for each item, financial data relating to an item(s) (e.g., net profit realized by an item(s)), and any other information associated with the operations of the retail service offered by the merchant 102. As one illustrative example, the merchant 102 may release a new item, such as a new movie on DVD that is offered in stores and online on a particular release date. The server(s) 112, via the bundle generator 130, may access operational data to find other movies that were directed by the same director, or perhaps earlier movies in a series that might be offered in a product bundle together with the new movie being released.

With access to the aforementioned data stores, the bundle generator 130 may utilize frequent item set algorithms to compare any portion of the accessed data, in any combination, to criteria, thresholds or scores in order to generate the set of potential bundles. For example, in order for a set of two or more items to qualify for inclusion in a set of potential product bundles generated by the bundle generator 130, any one of the items in the set of two or more items may be required to have been purchased a minimum number of times as compared to a threshold number of purchases. Similarly, any pair of two items may be required to have been purchased together at the same time some minimum number of times as compared to another threshold number of purchases in order to qualify for inclusion in the set of potential product bundles. Alternatively, or in addition to the above mentioned thresholds, scoring algorithms may be utilized by the bundle generator 130 in order to analyze any portion(s) and/or combination of order data 132 to determine scores for a group of two or more items, which is described in more detail below. These scores may be used to generate the set of potential product bundles for ranking by the bundle ranking component 138. A higher score for a given set of items may result in the inclusion of that set of items within the set of potential product bundles. In some implementations, the score for a set of items may be an indication of a customer's propensity to purchase the set of items together.

After a set of potential bundles has been generated by the bundle generator 130, a bundle ranking component 138 may receive the set of potential bundles that has been generated in order to rank, or score, the set of potential bundles in some meaningful way. The purpose of ranking the set of potential bundles is to identify those bundles, among the set of potential bundles, which yield high value for the customers 104, the merchant 102, and/or the third party merchant(s) 106. In embodiments, relevance ranking functions are utilized by the bundle ranking component 138 in order to rank the set of potential product bundles. These relevance ranking functions may take into account the scores computed for each of the product bundles by the bundle generator 130, or alternatively, the bundle ranking component 138 may compute scores for the product bundles if such scores have not been previously computed by the bundle generator 130. In this scenario, the bundle ranking component 138 may access, directly or indirectly, the order data 132.

In some embodiments, the relevance ranking functions may be based at least in part on additional opportunity metrics including, but not limited to, hot selling items or purchase velocities (e.g., statistics of 1 day trends, or 30 day trends, and the like), a number of similar product bundle offers in the market place by other merchants/competitors, whether offerings are perishable or unhealthy, and a profit projection, or estimation, which may consider a roll-up of the projected profits for each item in the product bundle along with some assumed bundle discount (e.g., a 5% discount for buying the items together as a bundle). All of these, or any similar, opportunity metrics may be chosen for their qualities of helping to indicate high value product bundles, or product bundles that should be given a higher priority for immediate offer because they are timely for one reason or another (e.g., perishable or trending product bundles). Any combination of some or all of the opportunity metrics and scores may be normalized (i.e., converted from differing scales across the various metrics and scores to a common scale) and utilized for computing an overall opportunity score used for ranking of the set of potential product bundles. The output of the bundle ranking component 138 is a ranked list of product bundles in the set of potential product bundles with product bundles that are more promising (i.e., relevant, valuable, and/or timely) ranked higher than the other product bundles.

In some embodiments, the overall opportunity score may be based on any suitable algorithm given the nature of the opportunity metrics and scores, such as a data counting algorithm, weighting algorithm or clustering algorithm (e.g., K-means algorithm). For example, weights may be assigned to the different opportunity metrics wherein the weighting is based on the propensity that a given opportunity metric or score has for indicating relevant, valuable, or timely product bundles. For example, the merchant 102 may decide that a projected profit metric should be given a higher weight than a trending item metric, because profit is more important to the merchant 102 in the decision to offer the most promising product bundles than whether items in the bundle are currently trending. To this end, any of the opportunity metrics and scores utilized in ranking the set of potential product bundles may be adjusted according to the preferences and needs of the merchant 102 who is utilizing the bundle discovery platform.

The architecture 100 further includes a bundle/seller matching component 140 which has at least two core functions. A first core function is, upon receipt of the ranked list of product bundles from the bundle ranking component 138, to select, using some criteria or threshold, the highest ranking bundles in the set of potential product bundles. For instance, those product bundles with an overall opportunity score above a threshold opportunity score may be selected, or the top twenty product bundles in the set of potential product bundles may be selected. Other criteria and thresholds may also be utilized for selecting the highest ranking product bundles. For instance, in accordance with a particular strategy that the merchant 102 may have for selecting and presenting product bundles, the bundle discovery engine 128 may further assess how many bundles in the selected set of product bundles include a particular item(s). It may be desirable for the merchant 102, or another entity, to ensure that the particular item(s) are included in a number of product bundles of the selected set of product bundles that is specified by the merchant 102, or another entity. This may enable the merchant 102, or other entity, to meet some strategic aim for presenting suggested product bundles appropriately.

A second core function of the bundle/seller matching component 140 is to match, or pair, one or more merchants, including third party merchant(s) 106, with the selected set of product bundles based on available offerings of the merchants. This matching, or pairing, may utilize stock keeping unit (SKU) codes and offer stores in order to determine whether the merchant 102, or the third party merchant(s) 106, has at least one of the items within the selected bundles available in their offerings, and/or whether the merchants are currently offering any of the selected product bundles, or "nearly" the selected product bundles, for sale. In other words, a merchant may be considered for matching with a selected product bundle if the merchant either has at least one of the items in any of the selected product bundles available in its offerings or is currently selling one or more of the items within any of the selected product bundles. In the situation where a merchant is currently selling, or has available in its offerings, some, but not all, of the items in a selected product bundle, the bundle/seller matching component 140 may allow for advising the merchant, or otherwise recommending/suggesting the missing item(s) needed in order to sell a selected product bundle.

In some embodiments, the bundle/seller matching component 140 may prioritize matching of the selected product bundles with merchant 102, and may only secondarily match selected product bundles with the third party merchant(s)

106, with or without first receiving permission/authorization from the merchant 102. In other words, merchant 102 may control the process of matching product bundles to other merchants. In some embodiments, merchants may register with a bundle discovery service provided by the merchant 102 where registered merchants may receive notifications about high ranking bundles as an opt-in service to merchants. In additional embodiments, selected product bundles may be matched with customers 104 based at least in part on customer data 134, (e.g., customer profiles), in order to suggest one or more of the selected product bundles to customers 104 as a form of advertising in hopes of increasing customer sales.

A bundle presenter 142 may present, display, or otherwise communicate to a merchant(s) the product bundles that have been matched, or paired, with the merchant(s) by the bundle/seller matching component 140. The bundle presenter 142 may display one or more of the product bundles associated (i.e., matched) with the merchant(s) on a user interface that is associated with the merchant(s), described in more detail below. For example, the bundle presenter 142 may present the product bundles associated with the merchant via a graphical user interface with an information table, or list, detailing the top suggested bundles that the merchant may choose to sell based on available offerings. In addition, if the merchant has some, but not all, of the items in a selected product bundle, as described above, the bundle presenter 142 may present such product bundles in another information table detailing the top possible bundle opportunities for the merchant if they were to add the missing items in the product bundles to their offerings. The bundle presenter 142 may vary bundle presentation techniques across merchants. For example, the bundle presenter 142 may have a different presentation format for the merchant 102 than for the third party merchant(s) 106. The user interface for each merchant may further include a back-end filter(s) and/or management tools to enable the merchant to manage, or customize, their own queue of suggested product bundles. In some embodiments, bundle presenter 142 may generate and send an email, or other similar message, to notify the merchant of suggested bundles.

In some embodiments, the physical order and processing fulfillment center 124, described above, may be able to access the ranked product bundle information produced by the bundle ranking component 138 in order to utilize the data for organization of its warehouse inventory. Additionally, or alternatively, the bundle presenter 142 may present, display, or otherwise communicate to the physical order and processing fulfillment center 124 the ranked product bundle information, or the selected list of the highest ranking bundles. For instance, for the highest ranking product bundles in the set of potential product bundles, the fulfillment center 124 may choose to organize items within those high ranking product bundles such that they are in close proximity to one another within the physical confines of the warehouse. This may reduce order fulfillment processing time and expense by reducing the physical distance needed to assemble and fulfill product bundle orders.

Example Merchant Interface

Figure 2:
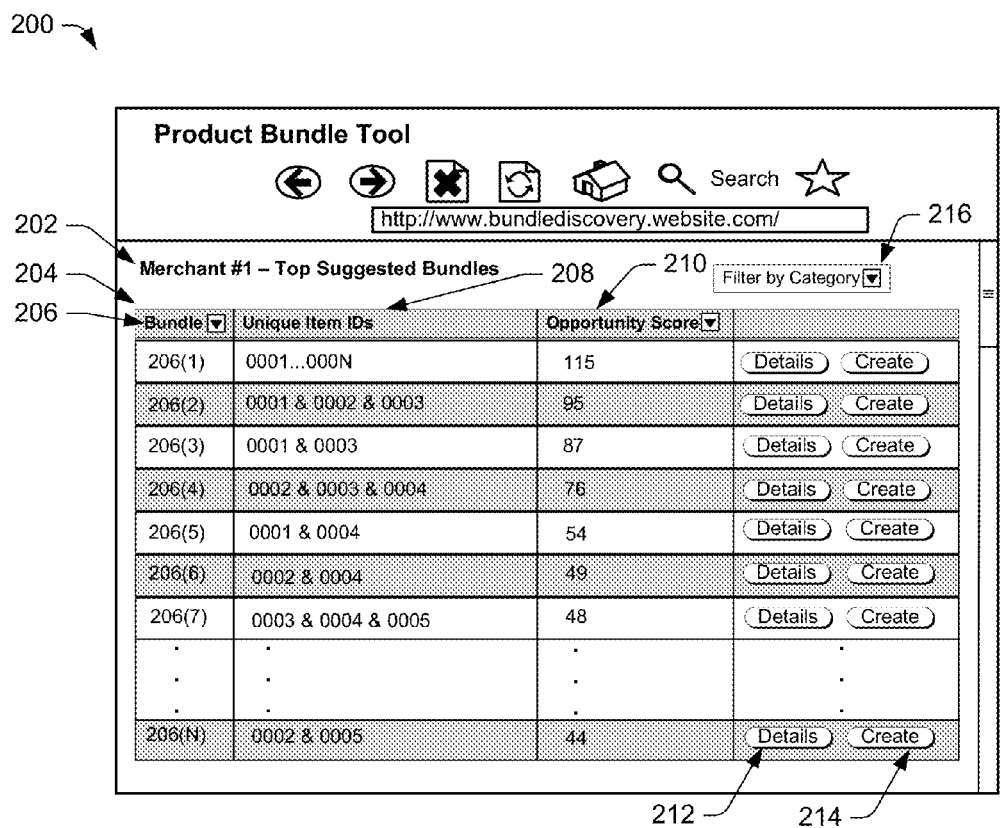
FIG. 2 illustrates an example screen rendering of a product bundle tool associated with a merchant where suggested product bundles are presented to the merchant.

FIG. 2 illustrates an example screen rendering of a product bundle user interface 200 including a plurality of suggested bundles associated with a merchant 102. In some embodiments, the user interface 200 may be a Web browser or other browser that can format text based on hypertext markup language (HTML) code. The user interface 200 may be stored and executed locally on a device (e.g., client devices 110, third party merchant devices 114, and similar devices for merchant 102), or remotely by a server such as an online application over a network (e.g., networks 108 and 120). The product bundle user interface 200 includes a message pane 202 with identification text or other informative text relating to the merchant 102 and to the product bundles selected for the merchant 102. The product bundle user interface 200 may contain a product bundle recommendation table 204 which may be used to communicate a selected product bundle(s) that the merchant 102 may sell based on available offerings of the merchant 102. The product bundle recommendation table 204 may include bundle identification column 206 for identifying, in ranked order, each bundle in the list, a unique item identification (ID) column 208 for identifying the individual items in each of the listed bundles, and an opportunity score column 210 which includes the overall opportunity score computed by the bundle ranking component 138 of FIG. 1, as described above. In FIG. 2, this overall opportunity score is the basis by which the list of bundles are ranked for the merchant, although alternate methods of ranking the list of product bundles may be utilized without changing the basic characteristics of the system. Furthermore, the merchant 102 may custom-sort, or otherwise reorder the bundles according to a preferred order which may override the default ranking scheme provided by the bundling tool. It is to be appreciated that even though many of the bundles in the bundle identification column 206 are shown in FIG. 2 as including two or three items, it should be apparent that the bundles may comprise any number of items such as items 0001-000N, shown in the unique item ID column 208 with reference to bundle 206(1).

Each product bundle in the list further includes a details button 212, which, upon selection by the merchant 102, provides more information/detail regarding how the scoring of the bundle was computed, and/or item descriptions for the individual items, and/or an overall bundle description. This detail information may, for example, be provided via pop-up windows or other linked pages to display information. Furthermore, each product bundle in the list may include a create button 214 which enables the pre-filling of a form to allow the merchant 102 to list the product bundle on its website for sale to customers 104. In some embodiments, the product bundle user interface 200 may further include a back-end filter 216 for filtering the product bundle recommendation table 204 by criteria such as item category. For instance, upon selection of the drop down arrow next to the "Filter by Category" label, a list of categories may appear in a drop down menu whereby the merchant 102 may select item categories such that only those product bundles that belong to the selected item categories will be presented in the product bundle recommendation table 204. The merchant 102 may further customize their product bundle recommendation table 204 via selecting icons to manipulate and further manage the information presented to them.

In an illustrative example, as shown in FIG. 2, bundles 206(1)-206(N) may have been selected by the bundle/seller matching component 140 as the highest ranking bundles in a set of potential product bundles that met a particular criterion for selection, as described above. These bundles may have been selected for pairing with Merchant #1 based at least in part on available offerings of Merchant #1 in that Merchant #1 has items 0001-000N in stock and available for sale. Merchant #1, when presented with the top suggested bundles by the bundle presenter 142 in the form of the product bundle user interface 200 may decide that he or she would like to sell his or her available items 0001, 0002 and 0003 in product bundles according to bundles 206(2) and 206(3) due to their relatively high opportunity scores among the list of suggested product bundles. Merchant #1 may not have been aware of such product bundling opportunities if left to manually monitor sales activity. By leveraging the bundle discovery platform disclosed herein, Merchant #1 may realize increase sales, impart value to his or her customers 104, and reduce slow moving offerings by bundling according to the suggested product bundles.

Figure 3:
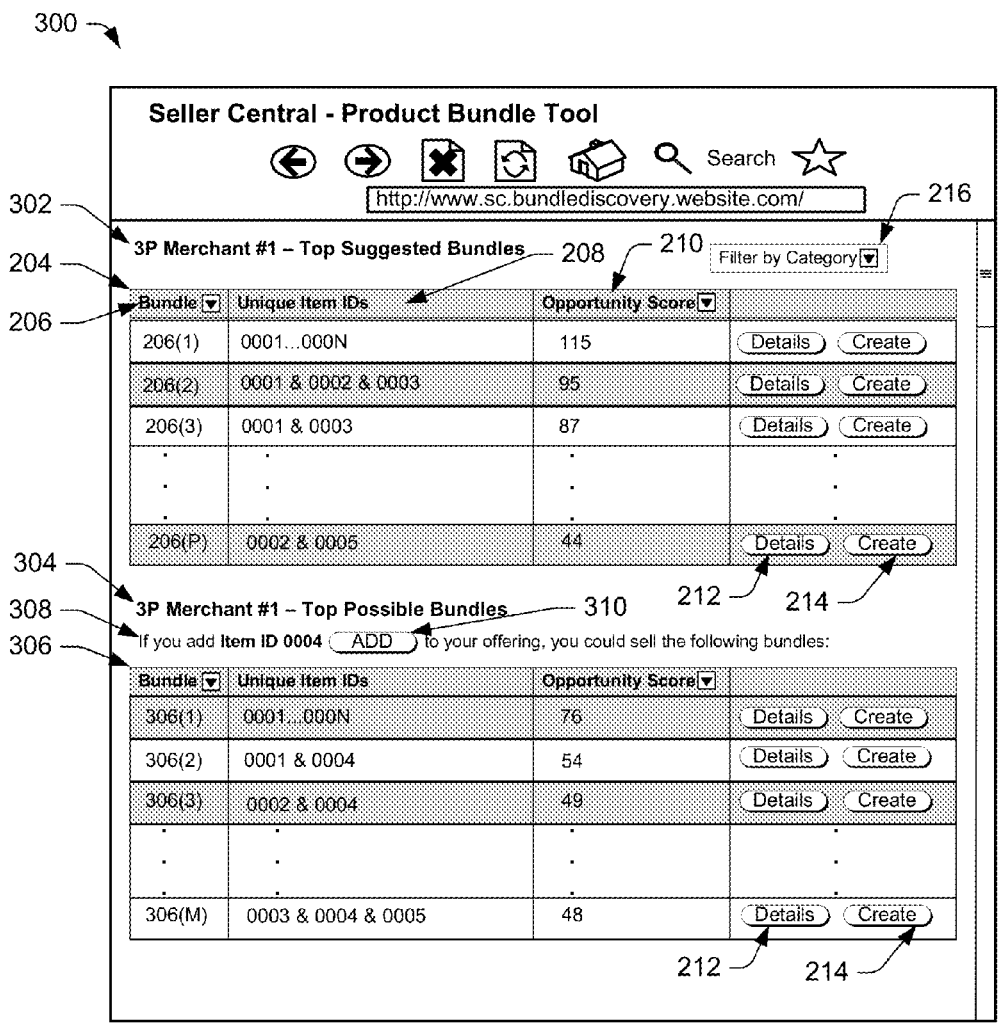
FIG. 3 illustrates an example screen rendering of a product bundle tool associated with a merchant where possible product bundles, as well as suggested product bundles, are presented to the merchant.

FIG. 3 illustrates another example screen rendering of a product bundle user interface 300 including a listing of suggested bundles, as well as a list of possible bundles, associated with a third party merchant(s) 106 based on the available offerings of the third party merchant(s) 106. It is to be appreciated that the product bundle user interface 300 according to FIG. 3 may be utilized for presentation to any merchant, including merchant 102 of FIG. 1. However, FIG. 3 is described in the context of the third party merchant(s) 106 by way of example only. Similar to the user interface 200 shown in FIG. 2, the product bundle user interface 300 includes a message pane 302 with identification text or other informative text relating to the third party merchant 106 and to the product bundles suggested for that merchant. In the same manner as shown in the user interface 200 of FIG. 2, the product bundle user interface 300 may contain a product bundle recommendation table 204 which may be used to communicate a list of suggested product bundles that the third party merchant 106 may sell based on available offerings of the third party merchant 106. The product bundle recommendation table 204 may include the bundle identification column 206, the unique item ID column 208, and the opportunity score column 210. The third party merchant 106 may custom-sort, or otherwise reorder, the bundles according to a preferred order which may override the default ranking scheme provided by the bundling tool. Each product bundle in the list further includes the details button 212 and the create button 214, as described with reference to FIG. 2. In some embodiments, the product bundle user interface 300 may further include a back-end filter 216, as described with reference to FIG. 2. The product bundle user interface 300 may further include a second message pane 304 with identification text or other informative text relating to the third party merchant 106 and relating to the product bundles that may be possible for the third party merchant 106 to sell if the third party merchant 106 were to add a missing item(s) that they currently do not have in their offerings. The product bundle user interface 300 includes a possible product bundle recommendation table 306, similar to table 204, but which may be used to communicate a list of possible product bundles that the third party merchant 106 may sell based on available offerings of the third party merchant 106. The possible product bundle recommendation table 306 may include the same, or similar, columns to those described above with reference to the product bundle recommendation table 204, such as the bundle identification column 206, unique item ID column 208, and opportunity score column 210, and each product bundle in the list may include the same details button 212 and create button 214 as those shown in FIG. 2. Additionally, product bundle user interface 300 may include descriptive text 308 relating to the missing item(s) that must be added by the third party merchant 106 if they intend to sell any of the product bundles listed in the possible product bundle recommendation table 306. In some embodiments, an "add" button 310 may be provided in proximity to, or within, the text 308 associated with the missing item(s) which, upon selection by the third party merchant 106, may direct the third party merchant 106 to a tool for ordering/purchasing the missing item(s) and thereby adding the missing item(s) to their available offerings.

In an illustrative example, as shown in FIG. 3, bundles 206(1)-206(P) may have been selected by the bundle/seller matching component 140 as the highest ranking bundles in a set of potential product bundles that met a particular criterion for selection, as described above. These bundles may have been selected for pairing with 3P Merchant #1 based at least in part on available offerings of 3P Merchant #1 in that 3P Merchant #1 has items 0001-000N in stock and available for sale. 3P Merchant #1, when presented with the top suggested bundles by the bundle presenter 142 in the form of the product bundle user interface 300 may decide that he or she would like to sell his or her available items 0001, 0002 and 0003 in product bundles according to bundles 206(2) and 206(3) due to their relatively high opportunity scores among the list of suggested product bundles. Additionally, bundles 306(1)-306(M) may have been selected by the bundle/seller matching component 140 as high ranking bundles in a set of potential product bundles that also met a particular criteria for selection as possible product bundles, as described above. 3P Merchant #1 may desire to sell bundles 306(2) and 306(3) of the possible bundles, but will need to add item ID 0004 to his or her offerings in order to sell bundles 306(2) and 306(3) in the possible product bundle recommendation table 306. Accordingly, 3P Merchant #1 may add item ID 0004 to his or her offerings by selecting the add button 310 and may thereby sell any of the bundles listed in the possible product bundle recommendation table 306.

Example Bundle Discovery Implementation

Figure 4:
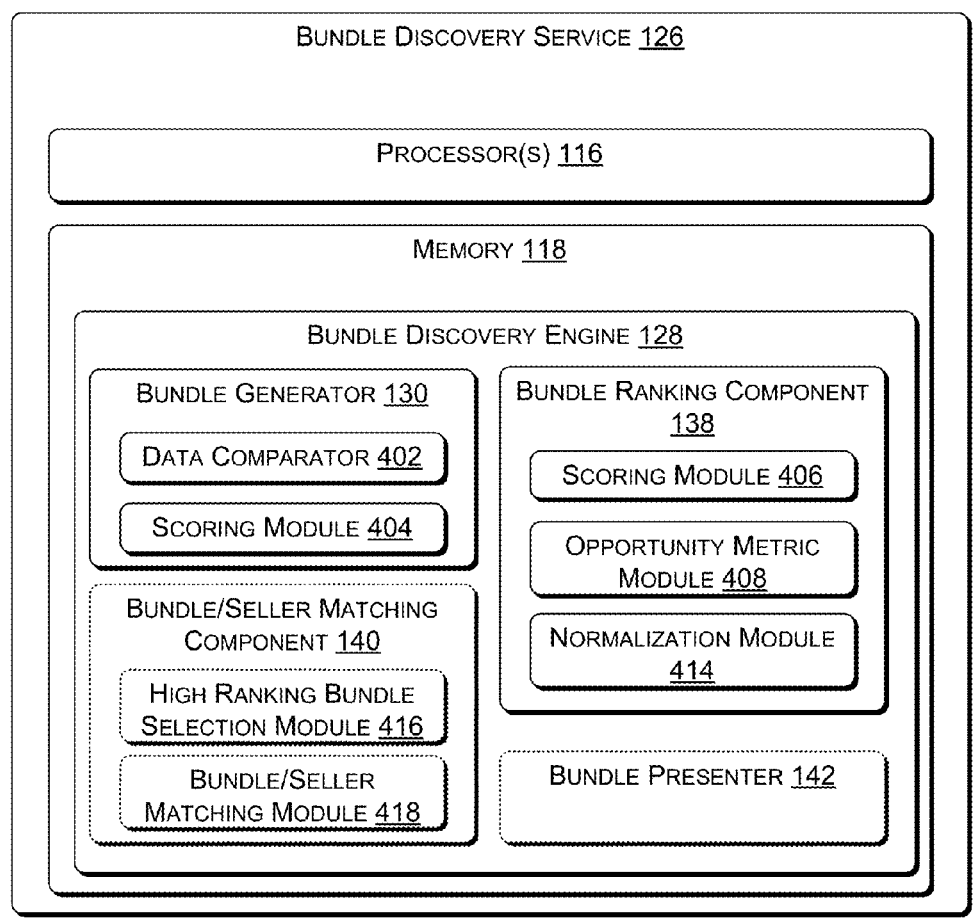
FIG. 4 is a block diagram illustrating embodiments of modules included in a bundle generator, a bundle ranking component and a bundle/seller matching component.

FIG. 4 illustrates an example implementation 400 of the bundle discovery service 126. The bundle discovery service 126 utilizes the bundle discovery engine 128 including the bundle generator 130, bundle ranking component 138, bundle/seller matching component 140, and bundle presenter 142 that are implemented as software or computer-executable instructions stored in the memory 118 and executed by one or more of the processors 116 located on the server(s) 112. As detailed above, the server(s) 112 have processing capabilities and memory suitable to store and execute computer-executable instructions.

The bundle generator 130, the bundle ranking component 138 and the bundle/seller matching component 140 each may include a multitude of modules. Generally speaking, the bundle generator 130 may access data from any of the data stores within data warehouse 131 (i.e., order data 132, customer data 134 and operational data 136), directly or indirectly, and may compare, using a data comparator 402, any portion(s) and/or combination of the accessed data to criteria and/or thresholds in order to generate the set of potential bundles. For example, in order for a set of two or more items to qualify for inclusion in the set of potential product bundles, any one of the items in the set of two or more items may be required to have been purchased a minimum number of times as compared to a threshold number of purchases. Similarly, any pair of two items may be required to have been purchased together some minimum number of times as compared to another threshold number of purchases in order to qualify for inclusion in the set of potential product bundles. Accordingly, the data comparator 402 is configured to compare accessed data regarding the number of times each of the items in the set of two or more items have been purchased individually and jointly, and compare the data to the appropriate thresholds. As another example, data comparator 402 may compare item category criteria to item category information associated with each item in the set of two or more items which was obtained from the operational data 136. This may ensure that only those product bundles including items of a certain category are included in the generated set of potential product bundles. This may be desirable if, for instance, a merchant only sold merchandise in a particular item category (e.g., consumer electronics).

In embodiments, the bundle generator 130 may utilize a scoring module 404 to analyze any portion(s) and/or combination of order data 132, to determine scores, called "association scores" and/or "bundleability scores," for a pair of items or a group of more than two items, respectively. Either or both of the association or bundleability scores may be used to generate the set of potential product bundles for ranking by the bundle ranking component 138. A higher association and/or bundleability score for a given set of items may result in the inclusion of that set of items within the set of potential product bundles. In some implementations, the association score and bundleability score for a set of items, as determined by the scoring module 404, may be an indication of a customer's propensity to purchase the set of items together. Accordingly, a scoring algorithm may be leveraged by the scoring module 404 in order to generate the association scores and the bundleability scores for any given group of items. As one illustrative example, an association score may be computed for any given pair of items as follows:

For two items A and B, let N(A,B) denote the number of times A and B were purchased together in a purchase order, and let N(A) denote the number of times A was purchased at all (i.e., with or without B). Similarly, let N(B) denote the number of times B was purchased at all during the same time frame. The association score between the item pair A and B may be computed as:

$$assoc(A, B) = \frac{N(A, B)}{\sqrt{N(A)N(B)}}, \quad (1)$$

The computed association score for the item pair A and B indicates a customer's propensity to purchase items A and B together. It should be noted that the maximum association score that a pair of items may have is 1.0, and this occurs when the pair of items have exclusively been purchased together, but not separately. Conversely, the minimum association score is zero, and this occurs when each item in the pair of items was exclusively purchased separately, but never purchased together with the other item. The association score between a pair of items increases the more the pair of items are purchased together and decreases the more each of the items in the pair of items are purchased at all (i.e. with or without the other item), relative to the number of times the pair of items were purchased together in a purchase order. It should also be appreciated that the association score may be computed in other suitable ways that are apparent to a person having ordinary skill in the art, such as by the number of times a plurality of items have been viewed or promoted together, the number of times a pair of products were mentioned in a customer product review or news article, a correlations in sales over time for two or more products (e.g., products that tend to be purchased around the same time of year, though not necessarily ever purchased together in a single transaction), etc. Accordingly, the association score is based at least in part on an association between a plurality of items.

When a group of items consists of more than two items, the bundleability score may be computed by the scoring module 404, which is indicative of a customer's propensity to purchase all of the items in the group together. As one illustrative example, the bundleability score for a group of items $x_1, x_2 \ldots x_N$ may be computed for any given set of more than two items as follows:

$$bundleability(x1, x2 \ldots xN) = \sqrt[n]{assoc(x1, x2) \ldots assoc(x1, xN) assoc(x2, xN)}, \quad (2)$$

Where $$n = \frac{N(N-1)}{2}.$$

The bundleability score of equation (2) represents the geometric average of the association scores of all pairs of items within the group of more than two items $x_1, x_2 \ldots x_N$. Other suitable ways of computing the bundleability score may be apparent to a person having ordinary skill in the art, which may be utilized for generating or ranking product bundles without changing the basic characteristics of the platform. The geometric average is one suitable calculation for the bundleability score and may be more appropriate than the arithmetic average simply because it is more sensitive to pairs of items that have low association scores. For instance, the arithmetic average of an association score of 0.9 and an association score of 0.1 equals 0.5, while the geometric average of the same two association scores is only 0.3. Accordingly, this bundleability scoring methodology, or any other suitable algorithm, may be utilized in lieu of, or in addition to, the association scores, basic thresholds or other criteria for determining whether a set of more than two items qualify for inclusion in the set of potential product bundles. Alternatively, groups of more than two items could be scored according to the minimum association between any pair of items in the group. However, unlike the geometric mean, this would not give any weight to the higher scoring pairs in the group. Furthermore, the order data 132 may be processed and used in a Chi-squared test of independence between items, or to compute the mutual information between two items as another alternative form of scoring sets of two or more items.

As discussed above, embodiments may also include the bundle ranking component 138 to identify those bundles, among the set of potential bundles, which yield high value for the customers 104, the merchant 102, and/or the third party merchant(s) 106. The bundle ranking component 138 may have a number of modules such as a scoring module 406, an opportunity metric module 408, and a normalization module 414. The scoring module 406 is configured to compute association scores and bundleability scores, among other things. In the situation where the bundle generator 130 does not compute association or bundleability scores for the product bundles, the scoring module 406 within the bundle ranking component 138 may, upon receipt of the set of potential bundles from the bundle generator 130, compute association and/or bundleability scores for each of the product bundles in the same manner as that which was described above with reference to the bundle generator 130. In this scenario, the bundle ranking component 138 may access, directly or indirectly, the order data 132. The computed scores for each product bundle may be used in relevance ranking functions, as mentioned above, in order to rank the product bundles.

The opportunity metric module 408 may include a variety of sub-modules that are configured for various purposes. For instance, the opportunity metric module 408 may include a marketplace comparator configured to determine a number of similar product bundle offers in the marketplace that are currently being offered by other merchants, including competitors of merchant 102. To this end, the opportunity metric module 408 may access, directly or indirectly, the operational data 136 which may include data associated with offers of product bundles in the marketplace. Accordingly, the marketplace comparator may use criteria such as at least two items in any product bundle must be offered in another merchant's product bundle in order to be considered a "similar" product bundle. As an illustrative example, product bundle A may have been included in the set of potential product bundles that was generated by the bundle generator 130. The marketplace comparator, upon receipt of the set of potential product bundles, including product bundle A, from the bundle generator 130, may assess information regarding product bundles offered by other merchants in the marketplace to determine whether at least two items in product bundle A are included in any known product bundles currently being offered in the marketplace, according to operational data 136. If the marketplace comparator finds other similar product bundles to that of product bundle A, it may assign a score, or increment a counter, for product bundle A in order to indicate that one or more similar product bundles are currently being offered in the marketplace by one or more other merchants. The assigned score may correlate with the notion that fewer existing offers for product bundle A in the marketplace may indicate the potential for a competitive advantage.

The opportunity metric module 408 may further include a sub-module such as an offerings velocity module configured to determine whether offerings are hot selling or trending, or whether offerings are slow-moving, unhealthy, or otherwise dead (i.e., no items are being sold or moved over a period of time). Offerings could be unhealthy because the item(s) therein is perishable (e.g., groceries including fruit or vegetables), or offerings could be unhealthy simply due to the fact that customers 104 are not purchasing the particular item(s) of the offering for whatever reason (e.g., items are out of season, or out of fashion, etc.). Accordingly, the offerings velocity module may access, directly or indirectly, the order data 132 to determine, based on orders, or sales, over a period of time, whether an item(s) does not meet a threshold number of orders over a period of time in order to qualify as an unhealthy offering, or whether an item(s) meets, or exceeds, the threshold number of orders over a period of time to qualify as a trending offering. Additionally, or alternatively, offerings velocity module may access, directly or indirectly, operational data 136 to determine whether items have been labeled as perishable items, meaning that they have an expiration date, and thereafter comparing the current date to the expiration date of any perishable items to determine whether the offerings needs to be moved quickly. Similarly, particular offerings may be marked as sellable only within a certain season(s) (e.g., swimsuits may be sellable in the Summer, but not the Winter), and therefore the slow offerings velocity module may be configured to assess whether certain offerings are out of season or in season. Any similar method of determining whether offerings are trending or slow-moving/unhealthy may be utilized with the bundle ranking component 138.

The opportunity metric module 408 may further comprise a sub-module such as a profit projection module configured to determine a profit projection, or estimation, for each product bundle in the set of potential product bundles. The profit projection may access operational data 136 to obtain financial data therein and may be based at least in part on a roll-up, or summation, of the projected profits for each item within the product bundle along with some assumed bundle discount (e.g., a 5% discount for buying the items together as a bundle). For instance, a product bundle with a higher projected profit may correlate to a higher ranking of the product bundle among the set of potential product bundles. In some embodiments, profit may be measured in terms of any other expected or potential benefits (e.g., the possible upsell of additional, related items at or after checkout, service plans, profit sharing from a payment processor, return business by the customer, etc.).

In general, the opportunity metrics and scores that are determined by the opportunity metric module 408 and the scoring module 406 within the bundle ranking component 138 are an indication whether product bundles are either of high value to the merchant 102, including the third party merchant(s) 106, or the customers 104, or whether certain product bundles are timely for one reason or another (e.g., perishable or trending product bundles). Additional opportunity metrics may be determined and utilized by the bundle ranking component 138. However, due to the variety of opportunity metrics and scoring techniques, many of the metrics and scores will be measured on different scales that may not be comparable to one another. Accordingly, these opportunity metrics and scores may be normalized (i.e., converted to a common scale for comparison) by a normalization module 414 and thereafter utilized for computing an overall opportunity score used for ranking the set of potential product bundles. The normalization technique used by the normalization module 414 may be any suitable normalization technique known to a person having ordinary skill in the art.

The overall opportunity score may be computed by the scoring module 406, and after normalization of the opportunity metrics and scores associated with each product bundle. This overall opportunity score may be based on any suitable algorithm, referred to herein as a "relevance ranking function," such as a data counting algorithm, weighting algorithm or clustering algorithm (e.g., K-means algorithm). For example, weights may be assigned to different opportunity metrics which ultimately influence the overall opportunity score. In other words, a higher weighting factor for a given opportunity metric may cause that opportunity metric to influence the overall opportunity score to a greater degree. In addition, these weights may be customizable. For example, the merchant 102 may decide that the projected profit metric, calculated by the profit projection module, should be given a higher weight than a trending item metric because profit is more important to the merchant 102 in the decision to offer the most promising product bundles than whether items in the bundle are currently trending. To this end, any of the opportunity metrics and scores utilized in ranking the set of potential product bundles may be adjusted according to the preferences of the merchant 102 who is utilizing the bundle discovery platform. The output of the bundle ranking component 138 is a ranked set of potential product bundles where the product bundles that are more promising (i.e., relevant, valuable, and/or timely) are ranked higher than the other product bundles in the set of potential product bundles. As an illustrative example of what might be output by the bundle ranking component 138, Table 1

(continuing with the example shown in FIG. 2) shows bundles 206(1)-206(N) in ranked order according to each overall opportunity score. The association or bundleability scores, as well as the other opportunity metrics—shown in Table 1 as: 1-day trend, 30-day trend, and profit projection—are considered in the computation of the overall opportunity score, as described above.

TABLE 1

| Bundle | Prod. IDs | Qty | Assoc./ Bundblty. Score | 1-Day Trend | 30-Day Trend | Profit Proj. | Oppty Score |
|---|---|---|---|---|---|---|---|
| 206(1) | 0001 | 1 | 80 | +10K units | +4K units | +10 | 85 |
|  | 0002 | 2 |  |  |  |  |  |
| 206(2) | 0001 | 1 | 75 | +20K units | +1K units | +5 | 82 |
|  | 0002 | 2 |  |  |  |  |  |
|  | 0003 | 1 |  |  |  |  |  |
| 206(N) | 0002 | 2 | 79 | +15K units | +3K units | +3 | 80 |
|  | 0005 | 1 |  |  |  |  |  |

As discussed above, embodiments may also include the bundle/seller matching component 140 which may have a number of modules including a high ranking bundle selection module 416, and a bundle/seller matching module 418. The high ranking bundle selection module 416 is configured to, upon receipt of the ranked list of product bundles from the bundle ranking component 138, select, using some criteria or threshold, the highest ranking bundles in the set of potential product bundles. For instance, those product bundles with an overall opportunity score above a threshold opportunity score may be selected, or the top twenty product bundles in the set of potential product bundles may be selected. These thresholds and/or criteria may be determined by the merchant 102 and may be adjustable to the preferences of the merchant 102. In some instances, it may be beneficial to adjust the high ranking bundle selection module 416 such that it filters out more product bundles than it selects to help ensure that merchants receiving the list of selected product bundles are not over burdened with a large, cluttered list of product bundles. Other criteria and thresholds may also be utilized for selecting the highest ranking product bundles without changing the basic characteristics of the system.

The bundle/seller matching module 418 is configured to match, or pair, one or more merchants 102, including third party merchant(s) 106, with the selected set of product bundles based at least in part on available offerings of the merchants. This matching, or pairing, may utilize stock keeping unit (SKU) codes and/or offer stores in order to determine whether the merchant 102, or the third party merchant(s) 106, has at least one of the items within the selected bundles available in their offerings, and/or whether the merchants are currently offering any of the selected product bundles, or "nearly" the selected product bundles, for sale. In other words, a merchant may be considered for matching with a selected product bundle if the merchant either has at least one of the items in any of the selected product bundles in its offerings or is currently selling some or all of the items within any of the selected product bundles. In the situation where a merchant is currently selling, or has available in its offerings, some, but not all, of the items in a selected product bundle, the bundle/seller matching module 418 may allow for advising the merchant, or otherwise recommending/suggesting the missing item(s) needed in order to sell a selected product bundle. In some embodiments, the bundle/seller matching module 418 may prioritize matching the selected product bundles with merchant 102 that is implementing the bundle discovery platform, and may only secondarily match selected product bundles with the third party merchant(s) 106, with or without first receiving permission/authorization from the merchant 102. In other words, merchant 102 may control the process of matching, or otherwise notifying the third party merchant(s) 106. In some embodiments, merchants may register with a bundle discovery service provided by the merchant 102 where registered merchants may receive notifications about high ranking bundles, as an opt-in service to merchants. In additional embodiments, selected product bundles may be matched with customers 104 based at least in part on customer data 134, including customer profiles, in order to suggest one or more of the selected product bundles to customers 104 as a form of advertising. In further embodiments, merchant 102 may implement a manual review process of the selected product bundles that are matched with each merchant in order to ensure that each merchant is being presented with a manageable list of product bundles.

As described above, a bundle presenter 142 may present, display, or otherwise communicate to a merchant the product bundles that have been matched, or paired, with the merchant by the bundle/seller matching component 140. The bundle presenter 142 may display one or more of the product bundles that have been associated (i.e., matched) with the merchant on a user interface that is associated with the merchant, as described above and shown in FIGS. 2 and 3. The bundle presenter 142 may vary bundle presentation techniques across merchants. For example, the bundle presenter may have a different presentation format for the merchant 102 than for the third party merchant(s) 106. The user interface for each merchant may further include a back-end filter(s) and/or management tools to enable the merchant to manage, or customize, their own queue of suggested product bundles. In some embodiments, bundle presenter 142 may generate and send an email, or other similar message, to notify the merchant of suggested bundles.

Example Processes

Figure 5:
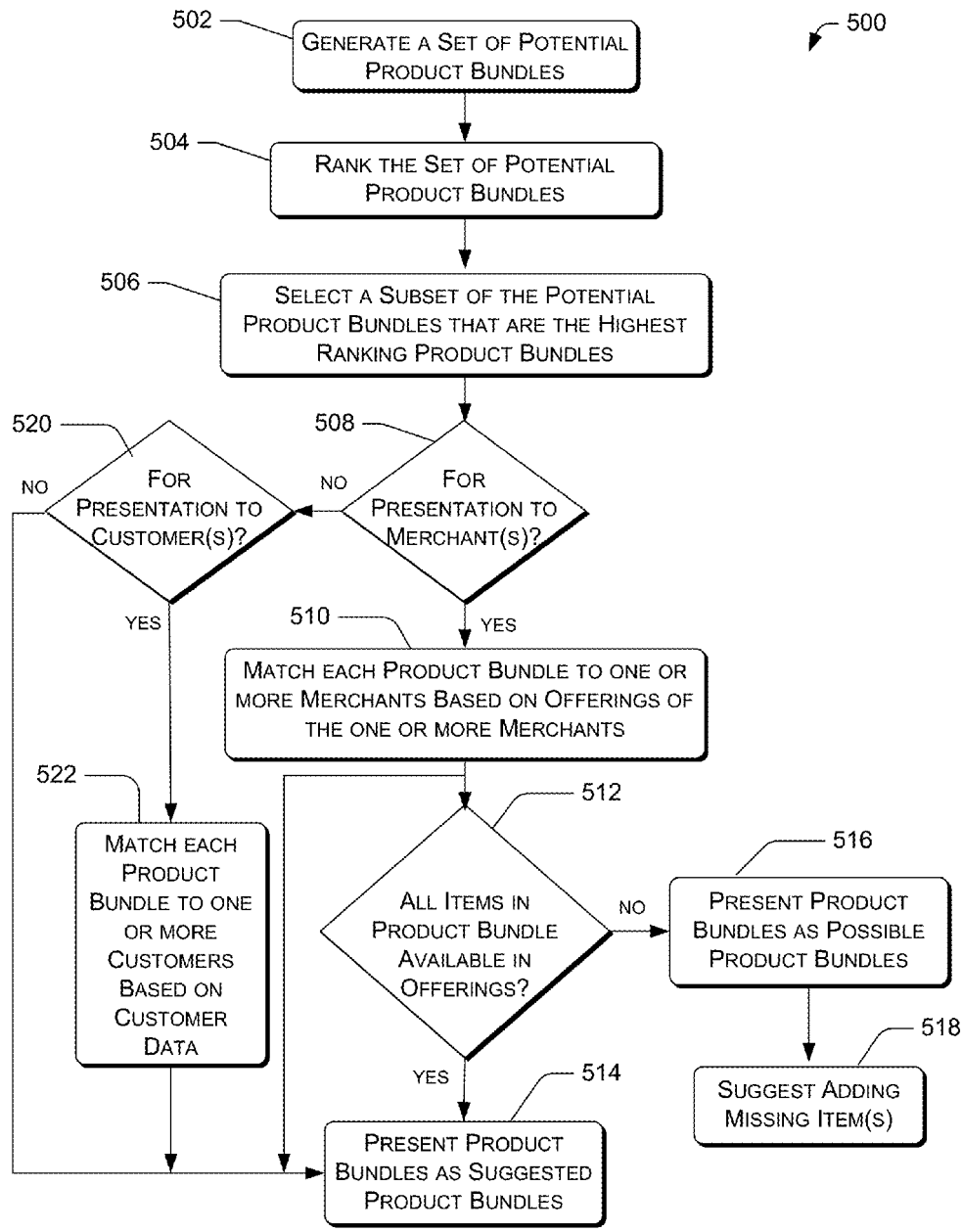
FIG. 5 is a flow diagram of an illustrative process for generating and identifying product bundles.

FIG. 5 is a flow diagram of an illustrative process 500 for generating promising (i.e., relevant, valuable and timely) product bundles. The process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process 500 is described with reference to the architecture 100 of FIG. 1, and the system of FIG. 4. In particular, many acts described below may be implemented and performed by the bundle generator 130, bundle ranking component 138, bundle/seller matching component 140 and bundle presenter 142.

At 502, a set of potential product bundles is generated for subsequent ranking. Bundle generation may take into account one or more criteria or thresholds, as described above, such as the number of times two or more items have been purchased together as compared to a threshold number of purchases. Additionally, or alternatively, the generation of bundles may be based at least in part on a calculated association score, or bundleability score, as described above in more detail.

The generated set of potential product bundles is ranked at 504. The ranking of product bundles is based at least in part on opportunity metrics, or association and/or bundleability scores, or any combination thereof, as described in more detail above. Relevance ranking functions may be used to rank a normalized set of metrics and/or scores such that product bundles that may be more relevant, valuable and/or timely may be ranked higher than other product bundles in the set of potential product bundles.

A subset of the potential product bundles constituting those product bundles of the highest rank relative to the other product bundles in the set is selected at 506. The selection of the subset of potential product bundles may be based on some criteria or threshold, such that the highest ranking bundles in the set of potential product bundles are selected. For instance, those product bundles with an overall opportunity score above a threshold opportunity score may be selected, or the top twenty product bundles in the set of potential product bundles may be selected.

At 508, the bundle/seller matching component 140, as shown in FIG. 1, may determine whether the selected subset of product bundles is to be presented to a merchant(s). If the selected subset is to be presented to a merchant(s), the process may proceed to 510 where each product bundle in the selected subset of the highest ranking product bundles are matched to merchants based at least in part on the offerings of the merchants. This matching, or pairing, may utilize stock keeping unit (SKU) codes and/or offer stores in order to determine whether the merchant 102, or the third party merchant(s) 106, has at least one of the items within the selected bundles available in their offerings, and/or whether the merchants are currently offering any of the selected product bundles, or "nearly" the selected product bundles, for sale, as described above. In further embodiments, merchant 102 may implement an optional manual review process of the selected product bundles that are matched with each merchant in order to ensure that each merchant is being presented with a manageable list of product bundles.

At 512, the bundle/seller matching module 418, as shown in FIG. 4, may optionally determine whether the merchant for an associated (i.e., matched) product bundle(s) has all of the items within the product bundle(s) available in the offerings of the merchant. The arrow from 510 directly to 514 illustrates that this is an optional feature. If the merchant has all of the items within the product bundle(s) in their offerings, the process proceeds to 514 where the matched product bundles are presented as suggested product bundles which the merchant may choose to offer for sale. If, for one or more product bundles matched to the merchant, the merchant is missing at least one item within the matched product bundle(s), the process proceeds to 516 where the product bundle(s) is presented to the merchant as a possible product bundle(s). In some situations, a merchant may be matched with multiple product bundles, some of which are fully available in the offerings of the merchant, and some of which the merchant may be required to add items to their offerings before they may sell the product bundle(s). Accordingly, the bundle presenter 142 may present two sets of product bundles corresponding to suggested product bundles and possible product bundles, and may suggest adding the missing item(s) 518, such as is shown in FIG. 3.

In the situation where a merchant is missing at least one item in their offerings for a given product bundle, text may be presented to the merchant via the user interface suggesting that the merchant add the missing item(s). Generally, the matched product bundles may be presented, displayed, or otherwise communicated to a merchant in various formats. The bundle presenter 142 may display one or more of the product bundles on a user interface that is associated with the merchant(s), as described above and shown in FIGS. 2 and 3. Presentations may vary across merchants. In some embodiments, an email, or similar message, with the matched product bundle information may be sent to the merchant's receipt address. Additional presentation may be envisioned to communicate product bundles to merchants.

In some embodiments, it may be desirable to utilize generated product bundles for other purposes outside of presentation to merchants. For example, customers 104 may benefit from information pertaining to relevant, valuable, and/or timely product bundles generated by the bundle discovery engine 128. Referring again to 508, if the selected subset is not to be presented to a merchant(s), the process may proceed to 520 where the bundle/seller matching component 140, may determine whether the selected subset of product bundles is to be presented to a customer(s). If the selected subset is to be presented to a customer(s), the process may proceed to 522 where each product bundle in the selected subset of the highest ranking product bundles are matched to customers 104 based at least in part on customer data 134, including customer profiles, in order to suggest one or more of the selected product bundles to customers 104 as a form of advertising in hopes of increasing customer sales. Matching a product bundle(s) to a customer may be based at least in part on information about the customers 104, such as customer account information, customer-specific purchase information, customer preferences or item reviews from customers, social network information, and other information associated with the customer. For instance, a customer who purchased at least one of the items in a product bundle of the selected subset may be inclined to purchase that product bundle. As another example, a customer's friend on a social networking site may have purchased a product bundle, and the customer may therefore also be interested in purchasing the product bundle.

Accordingly, the process may proceed to 514 where matched product bundles are presented as suggested product bundles to the customer which the customer may choose to purchase. Generally, the matched product bundles may be presented, displayed, or otherwise communicated to a customer in various formats. The bundle presenter 142 may display one or more of the product bundles via a pop-up window, or an advertisement banner on an e-commerce website. In some embodiments, an email, or similar message, with the matched product bundle information may be sent to the customer's receipt address. Additional presentation may be envisioned to communicate product bundles to customers.

If, at 520, it is determined that the selected subset is not to be presented to a customer(s), the process may proceed directly to 514 where the selected subset of the highest ranking bundles are presented, displayed, or otherwise communicated to any entity, such as vendors or manufacturers, who may purchase, or otherwise pay for access to, the bundle discovery service 126. For example, a manufacturer, in the interest of ramping up its business, may be interested in paying for access to the bundle discovery service 126 such that it would receive the suggested product bundles presented at 514 for consideration in manufacturing, or otherwise selling, the items included in the suggested product bundles. Additionally, other entities, such as the physical product fulfillment center 124, may be presented with the selected subset of product bundles to enable the fulfillment center 124 to organize the physical inventory in warehouses in such a way that fulfilling orders is more efficient. For example, items in product bundles which have a high score relative to other product bundles may be placed in close proximity to one another within the warehouse in order to reduce transport distance when fulfilling bundle orders.

Figure 6:
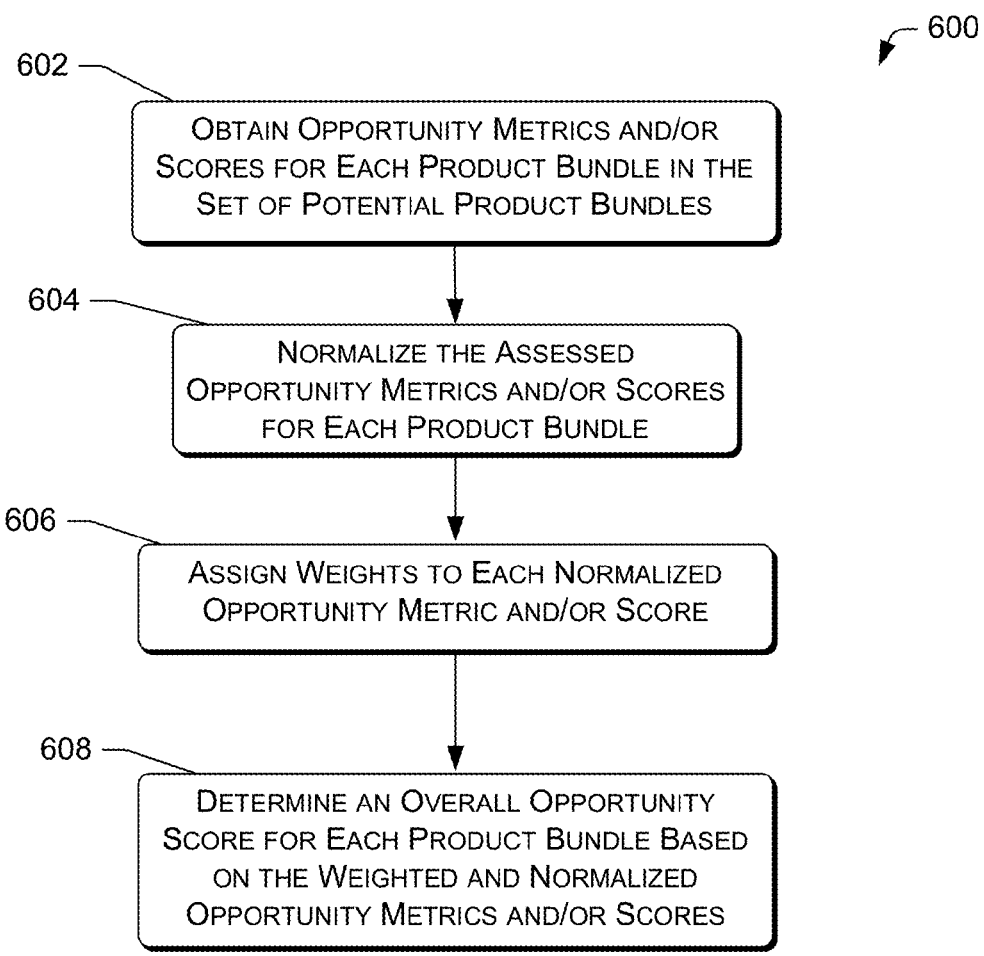
FIG. 6 is a flow diagram of an illustrative sub-process for ranking a set of potential product bundles.

FIG. 6 is a flow diagram of an illustrative sub-process 600 for ranking the set of potential product bundles as is shown in FIG. 5 at 504. For discussion purposes, the process 600 is described with reference to the architecture 100 of FIG. 1, and the system of FIG. 4. In particular, many acts described below may be implemented and performed by the bundle ranking component 138.

At 602, the bundle ranking component 138, may obtain opportunity metrics and/or scores for each product bundle in the set of potential product bundles. In the situation where the bundle generator 130 does not compute association or bundleability scores for the product bundles, the scoring module 406 within the bundle ranking component 138 may, upon receipt of the set of potential bundles from the bundle generator 130, compute association and/or bundleability scores for each of the product bundles, as described above. In addition, or alternatively, the bundle ranking component 138 may obtain, via the aforementioned modules 408-414 shown in FIG. 4, opportunity metrics including, but not limited to, purchase velocities (e.g., statistics of 1 day trends, or 30 day trends, and the like) of items, a number of similar product bundle offers in the market place by other merchants/competitors, whether offerings are perishable or unhealthy, and a profit projection, or estimation, and the like. In general, the opportunity metrics and scores that are determined by the various modules within the bundle ranking component 138 are an indication whether product bundles are either of high value to the merchant 102, including the third party merchant(s) 106, or the customers 104, or whether certain product bundles are timely for one reason or another (e.g., perishable or trending product bundles).

At 604, the obtained opportunity metrics and scores may be normalized (i.e., converted to a common scale for comparison) by a normalization module 414. This may be beneficial due to the variety of opportunity metrics and scoring techniques which may be measured on different scales. The normalization technique used by the normalization module 414 may be any suitable normalization technique known to a person having ordinary skill in the art.

At 606, weights may be assigned to different opportunity metrics and scores. The assigned weights may correlate to the degree of influence the associated opportunity metric has on the overall opportunity score, and may therefore indicate the propensity that a given opportunity metric or score has for indicating a relevant, valuable, or timely product bundle. In addition to assigning weights to opportunity metrics and scores, any suitable algorithm, referred to herein as a "relevance ranking function," such as a data counting algorithm, or clustering algorithm (e.g., K-means algorithm), may be utilized at 606.

At 608, an overall opportunity score may be computed by the scoring module 406, and may be based at least in part on the normalized and weighted opportunity metrics and scores associated with each product bundle. The bundle ranking component 138 may output a ranked set of potential product bundles based at least in part on the determined overall opportunity score for each product bundle. The intent of this ranking technique is to identify product bundles that are more promising (i.e., relevant, valuable, and/or timely).

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
generating, by one or more computing devices, a set of product bundles, each product bundle in the set of product bundles comprising a plurality of items purchasable by a customer in a single transaction;
determining, by at least one of the one or more computing devices, association scores for individual product bundles in the set of product bundles, the association scores being based at least in part on a number of times a pair of items have been purchased together and a number of times each item in the pair of items has been purchased alone and together with another item in the pair of items;
determining, by at least one of the one or more computing devices, a ranking of the set of product bundles according to the association scores determined for the individual product bundles;
selecting a subset of product bundles from the set of product bundles based at least in part on the ranking; and
for a product bundle, in the subset of product bundles, comprising a first physical product and a second physical product, organizing physical inventory within a fulfillment warehouse by reducing a distance between the first physical product and the second physical product within the fulfillment warehouse.

2. The method as recited in claim 1, further comprising:
determining that a merchant does not have at least one item of the plurality of items included in the product bundle;
presenting, via a user interface, the product bundle; and
providing a mechanism in the user interface to add the at least one item to an offering of the merchant.

3. The method as recited in claim 1, wherein generating the set of product bundles further comprises:
determining a number of times a set of two or more items has been purchased together;
determining that the number of times the set of two or more items has been purchased together meets or exceed a threshold number; and
including the set of two or more items as an individual product bundle within the set of product bundles.

4. The method as recited in claim 1, wherein generating the set of product bundles further comprises:
including the pair of items as an individual product bundle in the set of product bundles based at least in part on the association score for the pair of items.

5. The method as recited in claim 1, wherein generating the set of product bundles further comprises:
determining a bundleability score for a set of more than two items, the bundleability score based at least in part on a number of times at least two items in the set of more than two items have been purchased together; and
including the set of more than two items as an additional product bundle in the set of product bundles based at least in part on the bundleability score.

6. The method as recited in claim 5, wherein the bundleability score is calculated as a geometric average of the association scores of each pair of items within the set of more than two items.

7. The method as recited in claim 1, further comprising:
associating the product bundle with a merchant based at least in part on an offering of the merchant;
presenting, via a user interface, the product bundle;
receiving a selection, via the user interface, of a button associated with the product bundle; and
pre-filling, based at least in part on the selection of the button, a form to allow the merchant to list the product bundle on a website.

8. A computer-implemented method, comprising:
determining, by one or more computing devices, that a number of times that a set of two or more items has been purchased together meets or exceeds a threshold number;
generating, by at least one of the one or more computing devices, a set of product bundles by including the set of two or more items as a product bundle in the set of product bundles, individual product bundles in the set of product bundles comprising a plurality of items purchasable by a customer in a single transaction;
determining, by at least one of the one or more computing devices, a ranking of the individual product bundles in the set of product bundles;
selecting a subset of product bundles from the set of product bundles based at least in part on the ranking; and
for a product bundle, in the subset of product bundles, comprising a first physical product and a second physical product, organizing physical inventory within a fulfillment warehouse by reducing a distance between the first physical product and the second physical product within the fulfillment warehouse.

9. The method as recited in claim 8, further comprising determining individual association scores for the individual product bundles in the set of product bundles, the individual association scores being based at least in part on a number of times a pair of items have been purchased together and a number of times individual items in the pair of items have been purchased alone and together with another item in the pair of items.

10. The method as recited in claim 9, wherein determining the ranking is based at least in part on the individual association scores determined for the individual product bundles.

11. The method as recited in claim 8, further comprising:
associating the product bundle with a merchant based at least in part on an offering of the merchant;
determining that the merchant has the plurality of items included in the product bundle available in the offering of the merchant; and
causing presentation, via a user interface, of the product bundle as a suggested product bundle.

12. The method as recited in claim 8, further comprising:
associating the product bundle with a merchant based at least in part on an offering of the merchant;
determining that the merchant does not have at least one item in the product bundle; and
causing presentation, via a user interface, of the product bundle as a possible product bundle.

13. The method as recited in claim 12, further comprising providing an interface element in the user interface to add the at least one item to the offering of the merchant.

14. The method as recited in claim 8, wherein generating the set of product bundles further comprises:
determining a bundleability score for a set of more than two items, the bundleability score based at least in part on a number of times at least two items in the set of more than two items have been purchased together; and
including the set of more than two items as an additional product bundle in the set of product bundles based at least in part on the bundleablity score.

15. The method as recited in claim 14, further comprising determining individual association scores for individual pairs of items within the set of more than two items, wherein the association score for an individual pair of items is based at least in part on a number of times the individual pair of items have been purchased together and a number of times each item in the individual pair of items has been purchased alone and together with the other item in the individual pair of items, wherein the bundleability score is calculated as a geometric average of the individual association scores for the individual pairs of items within the set of more than two items.

16. The method as recited in claim 8, wherein determining the ranking further comprises:
for individual product bundles in the set of product bundles:
obtaining an opportunity metric, the opportunity metric being a measure of at least one of a relevance, a timeliness, or a potential profit of the product bundle;
normalizing the opportunity metric to obtain a normalized opportunity metric; and
assigning a weight to the normalized opportunity metric to obtain a normalized and weighted opportunity metric; and determining the ranking based at least in part on the normalized and weighted opportunity metrics for the set of product bundles.

17. The method as recited in claim 8, further comprising determining a number of similar product bundle offers in a marketplace, wherein the ranking is further based at least in part on the number of similar product bundle offers.

18. The method as recited in claim 8, further comprising associating individual product bundles in the subset of product bundles to one or more customers based at least in part on customer data.

19. A computer-implemented method, comprising:
determining, by one or more computing devices, individual association scores for individual pairs of items, an association score for a pair of items being based at least in part on a number of times the pair of items have been purchased together and a number of times each item in the pair of items has been purchased alone and together with another item in the pair of items;
generating, by at least one of the one or more computing devices, a set of product bundles based at least in part on the association scores, individual product bundles in the set of product bundles comprising a plurality of items purchasable by a customer in a single transaction;
determining, by at least one of the one or more computing devices, a ranking of the set of product bundles;
selecting a subset of product bundles from the set of product bundles based at least in part on the ranking, the subset of product bundles including at least one product bundle comprising a first physical product and a second physical product; and
organizing physical inventory within a fulfillment warehouse by reducing a distance between the first physical product and the second physical product within the fulfillment warehouse.

20. The method as recited in claim 19, wherein determining the ranking is based at least in part on the association scores.

21. The method as recited in claim 19, further comprising:
associating the at least one product bundle with a merchant based at least in part on an offering of the merchant;
determining that the merchant has the plurality of items included in the at least one product bundle available in the offering of the merchant; and
causing presentation, via a user interface, of the at least one product bundle as a suggested product bundle.

22. The method as recited in claim 19, further comprising:
associating the at least one product bundle with a merchant based at least in part on an offering of the merchant;
determining that the merchant does not have at least one item in the at least one product bundle; and
causing presentation, via a user interface, of the at least one product bundle as a possible product bundle.

23. The method as recited in claim 22, further comprising providing a mechanism in the user interface to add the at least one item to the offering of the merchant.

24. The method as recited in claim 19, wherein generating the set of product bundles further comprises:
determining a bundleability score for a set of more than two items, the bundleability score based at least in part on a number of times at least two items in the set of more than two items have been purchased together; and
including the set of more than two items as an additional product bundle in the set of product bundles based at least in part on the bundleablity score.

25. The method as recited in claim 24, further comprising determining individual association scores for individual pairs of items within the set of more than two items, wherein the association score for an individual pair of items is based at least in part on a number of times the individual pair of items have been purchased together and a number of times each item in the individual pair of items has been purchased alone and together with the other item in the individual pair of items, wherein the bundleability score is calculated as a geometric average of the individual association scores for the individual pairs of items within the set of more than two items.

26. The method as recited in claim 19, wherein determining the ranking further comprises:
for individual product bundles in the set of product bundles:
obtaining an opportunity metric, the opportunity metric being a measure of at least one of a relevance, a timeliness, or a potential profit of the product bundle;
normalizing the opportunity metric to obtain a normalized opportunity metric; and
assigning a weight to the normalized opportunity metric to obtain a normalized and weighted opportunity metric; and
determining the ranking based at least in part on the normalized and weighted opportunity metrics for the set of product bundles.

27. The method as recited in claim 19, further comprising determining a number of similar product bundle offers in a marketplace, wherein the ranking is further based at least in part on the number of similar product bundle offers.

28. The method as recited in claim 19, further comprising associating individual product bundles in the subset of product bundles to one or more customers based at least in part on customer data.

* * * * *